United States Patent [19]

Montesissa et al.

[11] 3,894,978

[45] July 15, 1975

[54] ALKYD RESINS MODIFIED WITH ACRYLIC OR METHACRYLIC ACID FOR USE IN WATER BASED PAINTS

[75] Inventors: Giorgio Montesissa; Antonio Olivieri; Giuseppe Scapellato, all of Piacenza, Italy

[73] Assignee: Duco S.p.A., Trieste, Italy

[22] Filed: Apr. 3, 1974

[21] Appl. No.: 456,949

[30] Foreign Application Priority Data
Apr. 9, 1973  Italy.................................. 22726/73

[52] U.S. Cl...... 260/22 CB; 117/124 E; 117/132 B; 117/147; 117/161 K; 260/23 P; 260/29.2 E
[51] Int. Cl............................ C09d 3/68; C09d 5/02
[58] Field of Search........... 260/22 CB, 23 CP, 23 P

[56] References Cited
UNITED STATES PATENTS

| | | | |
|---|---|---|---|
| 1,934,297 | 11/1933 | Eibner et al. | 260/23 CP |
| 2,559,466 | 7/1951 | Root | 260/23 P |
| 2,684,345 | 7/1954 | Yuska et al. | 260/23 CP |
| 2,686,765 | 8/1954 | Arvin | 260/23 P |
| 3,253,938 | 5/1966 | Hunt | 260/23 CP |
| 3,297,557 | 1/1967 | Huggard | 260/23 CP |
| 3,350,335 | 10/1967 | Silver | 260/23 P |
| 3,428,586 | 2/1969 | Coats | 260/23 P |
| 3,808,163 | 4/1974 | Wright et al. | 260/23 CP |

*Primary Examiner*—Ronald W. Griffin
*Attorney, Agent, or Firm*—Hubbell, Cohen, and Stiefel

[57] ABSTRACT

Alkyd resins comprising the reaction product of: (a) the resinous product substantially free of polyacrylic acid, which is obtained by reacting acrylic or methacrylic acid together with polyunsaturated monocarboxylic fatty acids or their esters with polyvalent alcohols, at temperatures between 250° and 300°C, and having a viscosity between the values P and $Z_6$ of the Gardner-Holdt scale, and an acidity number between 60 and 280; (b) a polyvalent alcohol in a weight ratio, with respect to product (a), between 1:9 and 9:1, and optionally (c) at least one compound capable of reacting with (a) or with (b) and being selected from the group consisting of saturated monocarboxylic acids, unsaturated monocarboxylic acids, saturated dicarboxylic acids, unsaturated dicarboxylic acids, siccative oils and non-siccative oils, the total amount of component (c) being not less than 10% and not more than 60% by weight of the total weight of (a) + (b) + (c).

8 Claims, No Drawings

ALKYD RESINS MODIFIED WITH ACRYLIC OR METHACRYLIC ACID FOR USE IN WATER BASED PAINTS

CROSS REFERENCE TO RELATED APPLICATIONS:

This application is related to application Serial No. 456,950, filed by Giorgio Montesissa and Giancarlo Del Signore owned by the assignee hereof, said application having been filed on Apr. 8, 1974. The contents of said application are expressly incorporated herein by reference.

BACKGROUND OF THE INVENTION

1. Field of the Invention

The present invention relates to water soluble or water dispersible alkyd resins which are particularly suited for the preparation of water based paints.

More particularly, the invention relates to alkyd resins modified with acrylic or methacrylic acid, wherein the in which said acid is present in the resin in the form of an addition product between said acid and polyunsaturated fatty acids or their esters.

2. Description of the Prior Art

Alkyd resins are generally insoluble in water, as a result of which, their use in the preparation of paints and varnishes usually requires that they be used in the form of solutions in organic solvents.

Attempts have been made to overcome the disadvantages inherent in the use of organic solvents for this purpose. These disadvantages are particularly; their danger, toxicity and high cost. Thus, these attempts have been directed to obtaining alkyd resins stably soluble or dispersible in water, and which at the same time are capable of supplying, as a vehicle or carrier for paints and varnishes, films of good mechanical and esthetic characteristics, particular, characteristics of gloss and resistance to yellowing and to the action of standard solvents, especially water.

According to a recent method, water-dispersible alkyd resins have been obtained by reacting an alkyd type resin with a polyoxyethylene glycol of suitable molecular weight. According to this method, there are obtained sufficiently water dispersible resins only if a polyoxyethylene glycol of low molecular weight is used. But then, the alkyd resins yield films with poor water resistance and low gloss.

In another recent method, the alkyd resin is prepared by using organic starting compounds having a certain number of free carboxylic acid groups, in order to obtain an acidic end product which becomes soluble, or at least dispersible in water after neutralization with a base.

A method of this nature is described in British Patent 1,032,364 wherein a polyhydric alcohol is reacted, at the polycondensation temperature, with a Diels-Alder type acid adduct obtained by adding maleic anhydride to a polyunsaturated fatty acid or to an ester thereof with a polyvalent alcohol.

The alkyd resins according to this patent are, in general, soluble or dispersible in water. However, they have unsatisfactory characteristics in use, because of the low water resistance of films, prepared therefrom, especially when such films are prepared by drying in air. They are also unsatisfactory from an esthetic point of view because of low brightness and very little color stability or fastness.

SUMMARY OF THE INVENTION

An object of the present invention is to provide water soluble or water dispersible alkyd resins for use in paints and varnishes that are free of the disadvantages of the known alkyd resins. As used herein, the term "alkyd resin" is intended to mean those resinous products that are obtained by polycondensation reaction between a polyhydric alcohol and a polycarboxylic acid or a polycarboxylic acid anhydride, which reaction is generally carried out in the presence of saturated or unsaturated fatty acids and/or siccative or semi-siccative oils.

According to the invention, it has been found that watersoluble or water dispersible alkyd resins which are capable of being used in readily air dryable paints which do not yellow even in a baking oven, and which are endowed with a superior water resistance and brightness, may be obtained by using, as an acid polycondensation compound, the resinous product substantially free of polyacrylic acid, which is obtained by reacting, at a temperature of 250°–300°C, acrylic or methacrylic acid together with polyunsaturated monocarboxylic fatty acids and/or esters thereof with polyvalent alcohols, and having an acidity number between 60 and 200, and a viscosity between the values P and $Z_6$ on the Gardner-Holdt scale.

Thus, the invention provides alkyd resins comprising the reaction product of: (a) the resinous product substantially free of polyacrylic acid, which is obtained by reacting acrylic or methacrylic acid together with polyunsaturated monocarboxylic fatty acids or their esters with polyvalent alcohols, at temperatures between 250° and 300°C, having a viscosity between the values P and $Z_6$ of the Gardner-Holdt scale, and an acidity number between 60 and 280; (b) a polyvalent alcohol in a weight ratio, with respect to product (a), between 1:9 and 9:1, and optionally (c) at least one compound capable of reacting with (a) or with (b) and being selected from the group consisting of saturated monocarboxylic acids, unsaturated monocarboxylic acids, saturated dicarboxylic acids, unsaturated dicarboxylic acids, siccative oils and non-siccative oils, the total amount of component (c) being not less than 10% and not more than 60% by weight of the total weight of (a) + (b) + (c).

DETAILED DESCRIPTION OF THE INVENTION

There will now be given a detailed description of the invention.

Preparation of resinous product (a), by reaction of acrylic or methacrylic acid with polyunsaturated monocarboxylic fatty acids or esters thereof.

These products and the method for their preparation are completely described in the above identified patent application which is incorporated by reference herein. Notwithstanding that the product (a) and method for preparing it are described in a reference incorporated herein, there will now be given a description of said product (a) and its method of preparation.

The resinous acid products, hereinafter referred to as "resinous acrylic derivatives," used in the preparation of the alkyd resins of this invention are prepared by using polyunsaturated monocarboxylic fatty acids containing from 9 to 20 carbon atoms, or esters of these acids with polyvalent alcohol acids, or mixtures of said acids and esters.

The preparation of the resinous acrylic derivative is carried out by reacting glacial acrylic or methacrylic acid with the above described polyunsaturated compound at a temperature between 250° and 300°C, while maintaining in the reaction mixture a weight ratio between the unreacted acrylic or methacrylic acid and the acrylic or methacrylic acid combined with the polyunsaturated compound between 0.1 and 1.

In practice, the reaction is carried out in a reactor provided with a heating sleeve, a stirrer and a reflux column. The polyunsaturated compound is introduced into the reactor and made anhydrous by heating at about 180°–220°C, preferably in the presence of small quatities of a hydrocarbon such as toluene, xylene, and the like, which is capable of forming an azotropic mixture with water. The temperature is then raised to a pre-selected value in the range 250°–300°C, and in an atmosphere of an inert gas or in the absence of an inert gas, the feeding of the acrylic or methacrylic acid is started with stirring, the feeding being regulated in such a manner as to maintain in the reacting mixture, a weight ratio of free, unreacted acrylic or methacrylic acid/combined acrylic or methacrylic acid, within the above defined limits, and preferably at a fixed value, with a tolerance within ± 0.05, in order to obtain an end product which is an uniform as possible.

The generally varying rate of reaction requires, in order to maintain said fixed ratio, non uniform additions of acrylic or methacrylic acid. Thus, the feed rate of the acrylic or methacrylic acid is initially determined, for example, by trial or through tests carried out separately under analogous conditions. Thereafter, by periodically checking the quantity of this acid present in the free state within the reaction mixture, by examining weighed samples of the reaction mixture drawn from the reactor, a suitable concentration of the acrylic or methacrylic acid in the mixture is maintained by varying the feed rate.

The reaction is carried out under reflux conditions, with a temperature at the column head of about 50°–60°C, that is sufficient to condense and recycle to the reactor all of the acrylic or methacrylic acid which evaporates from the reaction mixture.

The reaction is carried out at atmospheric pressure or at slightly above atmospheric pressure, but preferably at not more than 2 atmospheres.

Although under the reaction conditions described above, homopolymerization of the acrylic or methacrylic acid does not occur, in order to ennsure safety, the reaction mmay be effected in the presence of inhibitors of this polymerization, such as hydroquinone or derivatives thereof, without adversely affecting the reaction.

The course of the reaction is followed by periodically withdrawing samples of the reaction mixture from the reactor, and removing the uncombined acrylic or methacrylic acid, by distillation at about 60°–80°C under vacuum, after which determinations are made of the acidity and viscosity numbers of the remaining product.

When the reaction mass, after elimination of the unreacted acrylic or methacrylic acid, has a viscosity, measured at 25°C on the undiluted sample between about the values P and $Z_6$ of the Gardner-Holdt scale, and an acidity number between 60 and 280, preferably between 240 and 280 when the polyunsaturated compounds are fatty acids, and between 60 and 120 if esters of fatty acids are used, the reaction is interupted by stopping the acrylic or methacrylic acid feed and reducing the temperature in the reactor. Such acidity values correspond to a content of combined acrylic or methacrylic acid between about 8 and 15% by weight.

In the reaction there are used monocarboxylic fatty acids containing from 9 to 20 carbon atoms and at least two double bonds per molecule; these double bonds being preferably, but not necessarily conjugated double bonds, or esters of said acids with polyvalent alcohols such as glycerol, pentaerithritol, trimethylolpropane, and the like, or a mixture of said acids and esters.

Examples of suitable polyunsaturated acids are the acids derived from dehydrated castor-oil, soya oil, linseed-oil, coconut oil, safflower oil and tall oil.

Saturated and/or mono-unsaturated monocarboxylic fatty acids may be present in admixture with the polyunsaturated acids or esters used in the reaction, preferably, however, in amounts not exceeding about 50% by weight of total mixture.

PREPARATION OF ALKYD RESINS

Reactants

The polyvalent alcohols that may be used to prepare the alkyd resins of the invention must contain from two to six primary or secondary hydroxyl groups. Examples of such alcohols are: ethylene glycol, propylene glycol, 1,3-butylene glycol, pentanediol, diethylene glycol, triethylene glycol, trimethylolethane, glycerol, trimethylolpropane, pentaerithritol, mannitol, sorbitol and mixtures thereof. A particularly suitable polyalcohol containing secondary hydroxyl groups, is: [1,1'-isopropylidene-bis-(p-phenyleneoxy)di-propanol-2].

Among the polyvalent alcohols usable in the invention there are also included the polyoxyethylene glycols having a molecular weights between 1000 and 6000, and the alkoxypolyoxyethylene glycols having a molecular weights between 100 and 800. These types of glycols, which improve the dispersability of the resin; should not, however, be used in amounts exceeding 40% by weight of the total of the polyvalent alcohols used for preparing the alkyd resin; preferably, they are used in quantities between 10 and 35% of said total weight.

Compounds which, because of their capacity to react in the preparation of the alkyd resins that may be included among the polyvalent alcohols usable in this invention, are the $\alpha,\alpha'$-dimethylol-monocarboxylic acids, of which dimethylolpropionic acid is a typical example. Such oxyacids, however, should not be used in amounts exceeding 40% by weight of the total weight of the polyvalent alcohols; preferably they are used in amounts varying from 10 to 35% by weight of the total weight of the polyvalent alcohols used.

Included among the optional reactants in the previously defined group (c), there are the saturated aliphatic, cycloaliphatic and aromatic monocarboxylic acids having from 3 to 11 carbon atoms, such as caproic, caprylic, capric, isodecanoic, isooctanoic, cyclohexanoic, cyclopentanoic, benzoic and p-tertbutylbenzoic acid; aliphatic fatty acids containing from 12 to 20 carbon atoms, such as, lauric, palmitic and stearic acid; as well as unsaturated monocarboxylic acids such as crotonic acid; and in general, all the aliphatic fatty acids containing from 12 to 20 carbon atoms and having at least one ethylenic unsaturation in the molecule, such as, linoleic, linolenic and oleic acid.

The unsaturated and saturated dicarboxylic acids that may be used as reactants of group (c) contain from 4 to 10 carbon atoms and may be of the aliphatic, cycloaliphatic or aromatic series. While the preferred acids of this type are phthalic, isophthalic and terephtalic acid, there may also be used adipic, azelaic, succinic, sebacic, diglycolic, maleic and fumaric acids. As used herein, the term "dicarboxylic acid" also includes the corresponding acid anhydride.

The non-siccative, i.e., non-drying oils that may be used as possible reactants of group (c) in the preparation of the alkyd resins of this invention include the triglyceride fatty acids generally having from 8 to 22 carbon atoms in the molecule, including the oils conventionally known in the art as "non-siccative oils." Suitable non-siccatove oils are the vegetable oils such as peanut, coconut and olive oils and mixtures of said oils, as well as animal oils such as tallow and lard and the like.

The term "non-siccative oils" also includes the esters of unsaturated fatty acids having from 8 to 22 carbon atoms with triols such as trimethylolethane, trimethylolpropane and the like.

The siccative oils that may be used as possible reactants of group (c) iniclude the unsaturated triglycerides of fatty acids having in general from 10 to 22 carbon atoms, including the oils conventionally known in the art as siccative and semi-siccative oils. Suitable siccative oils that may be used include vegetable oils such as soya, safflower, linseed, cotton seed and dehydrated castor oils.

The term "siccative oils" also includes the esters of unsaturated fatty acids having from 10 to 22 carbon atoms with trivalent alcohols such as trimethylolethane, trimethylolpropane and the like.

METHOD FOR THE PREPARATION OF THE ALKYD RESIN OF THE INVENTION

The alkyd resins according to the invention are prepared by reacting, at a temperature between 140° and 300°C, a mixture comprising: (a) the acrylic resinous product, (b) the polyvalent alcohol in a weight ratio with respect to said resinous product that varies from 1:9 to 9:1, and optionally (c) one or more saturated or unsaturated mono- and dicarboxylic acids, and/or siccative and nonsiccative oils as defined above in amounts not exceeding 60% by weight of the total of the weight of (a), (b) and (c), and generally not less than 10% by weight of said total weight.

In cases where it is desired to employ, in addition to the acrylic resinous product (a) and the polyvalent alcohol (b) one or more of the above mentioned compounds (c), the preparation of the alkyd resin is preferably carried out by means of successive and partial reactions between the various reactants.

Thus, for example, it is possible to first prepare a condensate between a portion of the polyvalent alcohol and the saturated monocarboxylic acid and a siccative oil in the presence of an alcoholysis catalyst, and then to react the thus obtained product with the acrylic derivative, in the presence of additional amounts of the polyvalent alcohol and optionally of the polycarboxylic acids.

Alternatively, one may first react, at the polycondensation temperature, and using known techniques, the polyvalent alcohol with the polycarboxylic acid until suitable acidity and viscosity values have been reached, and to then react the obtained polycondensate with the acrylic derivative.

Alternatively, one may first prepare the monoglyceride of an oil by the reaction of the oil itself with an excess of the polyvalent alcohol in the presence or absence of an alcoholysis catalyst and, then, in a second phase, react such monoglyceride with a monocarboxylic acid together with a polyoxyethyleneglycol until a constant viscosity and acidity are achieved, and finally, reacting the obtained product with the resinous acrylic product optionally together with minor amounts of carboxylic acids and/or polyvalent alcohols.

In the course of the reaction for the formation of the alkyd resin, samples of the reaction mixture are periodically withdrawn, and their acidity and hydroxyl numbers, as well as the viscosity are determined. The reaction is then stopped by lowering the temperature when these values have reached the desired values.

The alkyd resin, however obtained, is ordinarily discharged under stirring, into a diluting device containing water at a temperature between 40° and 80°C, and optionally, a cosolvent, e.g., butylcellosolve, and an organic base, and is finally diluted with water until the desired concentration is obtained.

It has now been found that exceptionally satisfactory alkyd resins are obtained in the case of weight ratios between the resinous acrylic product and the total polyvalent alcohol used, of from 1:5 to 5:1. More particularly, when in the preparation of the alkyd resin there are also used one or more compounds of class c), there are obtained particularly suitable products by using, by weight 10 – 50 % of (a)

10 – 50 % of (b)

10 – 60 % of (c)

Preferred compositions of the starting reactants, depending on the type of reactant (c) used, are, for example:

1. 60% – 80% of (a) + (b)
    40% – 20% of saturated and/or unsaturated dicarboxylic acids
2. 50% – 80% of (a) + (b)
    10% – 40% of seccative or non-siccative oils
    5% – 15% of unsaturated dicarboxylic acids
3. 40% – 70% of (a) + (b)
    10% – 40% of siccative or non-siccative oils
    10% – 20% of saturated monocarboxylic acids
    10% – 30% of unsaturated dicarboxylic acids.

Specific reactant compositions which result in particularly good water dispersible alkyd resins comprise:

4. 10% – 20% of (a)
    25% – 35% of (b)
    5% – 15% of an alkoxypolyoxyethyleneglycol
    10% – 20% of saturated monocarboxylic acids
    10% – 40% of unsaturated dicarboxylic acids
    10% – 30% of siccative or non-siccative oils.

Specific reactant compositions which result in particularly good water soluble alkyd resins comprise:

5. 40% – 50% of (a)
    20% – 40% of (b)
    20% – 40% of saturated and/or unsaturated dicarboxylic acids.

The preparative examples which follow are given for illustrative purposes only, and are not to be construed as limiting the invention.

The characteristics of the obtained alkyd resins are examined by means of comparative tests with reference to commercial alkyd resins. Each resin, dispersed or dissolved in water, is transformed into a painting medium (paint vehicle) by the addition of lead or cobalt naphthenate and butylcellosolve, and is then applied onto a glass support, in the form of a film of about $20\mu$ thick which is then dried in air for 6–7 days at 25°C. The degree of yellowing of the dried film due to the action of atmospheric oxygen is then observed.

For water resistance, the glass-supported films are immersed in water at 25°C for 24 hours, after which the superficial aspect of the film is compared with that of the commercial resins. The examination of yellowing of the film due to baking, is carried out by transforming the alkyd resin into a medium for oven-paints, by adding up to 30% by weight of water soluble or water dispersible resins which will not yellow and which are capable of cross-linking with the alkyd resin under examination (e.g., melamine resins).

The vehicle or carrier thus obtained is applied to a glass-support, in the form of a film of about 20 microns thickness, and is then kept in an oven at 120°–150°C for 20–30 minutes.

PREPARATIVE EXAMPLES

EXAMPLE 1 a. Preparation of the resinous acrylic derivative.

Into a 6 liter reactor provided with a stirrer, a heating sleeve and reflux condenser, were introduced 1800 g of a mixture of dehydrated castor oil fatty acids having an acidity number of 175–180, together with 1.4 g of hydroquinone and 6 g of xylene.

The mixture was then heated at about 200°C, the heating being maintained until complete elimination of the traces of water present therein. The temperature was then raised to 260°C ($\pm$ 3°C) and glacial acrylic acid was introduced into the reactor at an initial flow rate of 20 g/hr., contemporaneously feeding into the reactor a slight but continuous flow of nitrogen. The temperature in the reflux column head was 60°C ($\pm$ 3°C).

From an examination of samples withdrawn from the reaction mixture at between 15 and 25 minutes after the start of the reaction, it was observed that about 75% of the introduced acrylic acid had reacted, while the remaining 25% remained in the free state in the reactor, corresponding to a weight ratio between free acrylic acid and combined acrylic acid, of about 0.3. The feeding of acrylic acid at a flow-rate of about 20 g/hr. was continued, but suitably varied during the course of the reaction, on the basis of examination of reaction samples periodically withdrawn, so as to maintain reaction conditions such that the above ratio will remain constant $\pm$ 0.05 throughout the reaction.

After 20 hours, during which time 360 g of acrylic acid were fed into the reactor, the reaction product, after being freed from the unreacted acrylic acid, had a viscosity, measured at 25°C on the undiluted product, between the values $Z_2$ and $Z_3$ of the Gardner-Holdt scale, and an acidity of about 255.

The feeding of the acrylic acid was then stopped and the mixture was brought, under vacuum, to a temperature between 60° and 80°C, and maintained thereat until all the unreacted acrylic acid had been removed by distillation. In this way, about 90 g of free acrylic acid were recovered.

The reaction product amounted to about 2080 g and had a combined acrylic acid content of about 13% by weight.

A sample of the thus obtained product was admixed with benzine at room temperture, in a weight ratio of 1:7, which resulted in a clear solution, proving the absence of significant amounts of polyacrylic acid in the reaction product.

b. Preparation of the alkyd resin.

1200 g of the addition acrylic derivative, as prepared above in (a), were introduced together with 688 g of [1,1'-isopropylenbis-(p-phenyloxy)-di-propanol-2], into a reactor fitted with a stirrer, and were reacted at a temperature of 220°C ($\pm$ 3°C). Periodically, the viscosity and acidity numbers of samples of the polycondensation product were determined.

The reaction was then stopped by reducing the temperature to 150°C when the reaction product had a viscosity between W and X on the Gardner-Holdt scale, measured at 25°C on an 80% xylene solution thereof, and an acidity number between 45 and 55.

The reaction product, amounting to about 1850 g was then diluted with butyl-cellulosolve to a concentration of 80% by weight. The solution was neutralized with triethylamine to a pH of 7.5 and then dissolved in deionized water to a concentration of 60% by weight.

To a sample of the thus prepared resin solution was then admixed 1% of lead and cobalt naphthenates, and the solution was then applied onto a glass support in the form of a $20\mu$ thick film.

This film was then left to dry in air. After immersion in water at 25°C for 24 hours, the film surface was unaltered and had a glossy aspect.

EXAMPLE 2 a. Preparation of the acrylic resinous derivative.

Into the reactor described in Example 1, part (a), were introduced 2400 g of a mixture of polyunsaturated monocarboxylic fatty acids, the so-called "isomerginic acids" (isomerginic acids S Y, of Hamburger Fettchemie Brinckman & Mergell GmbH.), having an acidity number of about 190, together with 9 g of xylene. After elimination of the traces of water present in the mixture by heating to about 200°–220°C, the temperature of the mixture was raised to 280°C ($\pm$ 3°C). Methacrylic acid was introduced into the reactor, under conditions such as to establish, by means of the procedures and controls described in Example 1, a weight ratio between free methacrylic acid and combined methacrylic acid, of 0.5 ($\pm$ 0.05).

After 20 hours, during which time 580 g of methacrylic acid had been fed into the reactor, the reaction was interrupted in the usual way to obtain about 195 g of unreacted methacrylic acid. The reaction product amounted to about 2790 g, had a Gardner-Holdt viscosity value, at 25°C, between $Z_5$ and $Z_6$, an acidity number of about 270 and a combined methacrylic acid content of about 13.8% by weight. The mixing of a sample of this product with benzine in a ratio of 1:7 indicated the presence of only traces of polymethacrylic acid.

b. Preparation of a water dispersible alkyd resin.

For the preparation of the alkyd resin, the following ingredients were used:

|  | Parts by weight | (%) |
|---|---|---|
| Acrylic resinous product (a) | 500 | 11.8 |
| Pentaerithritol | 879 | 20.7 |
| Polyoxyethylene glycol (mol. weight 4000) | 350 | 8.5 |
| p-toluenebenzoic acid | 600 | 14.1 |
| Phthalic anhydride | 860 | 20.9 |
| Safflower oil | 1043 | 24.6 |

Into a 6 liter reactor, fitted with a stirrer, all of the safflower oil, the polyoxyethyleneglycol, the p-toluenebenzoic acid and 649 parts of pentaerithritol as well as 2 parts of lithium hydroxide as an alcoholysis catalyst were introduced.

The mixture in the reactor was then brought up to 240°C and was maintained thereat for 3–4 hours, under stirring, until practically all of the acidity disappeared, after which it was cooled to about 150°C. At this temperature, all the resinous acid product (a), the phthalic anhydride, and the remaining pentaerithritol were introduced. The mixture was then brought to a temperature between 230°–250°C, and maintained thereat under constant stirring, until an acidity number of 13–18, and a Gardner-Holdt viscosity, measured at 25°C on a 60% solution of the product in xylene between U and W were attained. Thereupon, the reaction mass, about 3800, g, was cooled and discharged into a diluting device containing water at 40°–50°C and triethylamine in an amount sufficient to obtain a concentration of 45% of dry product and a pH equal to 6–7.

Following the procedures described above, the characteristics of the thus prepared resin were compared with those of a commercial aqueous alkyd resin having an acidity number between 15 and 20, and a viscosity at 25°C in a 60% solution in xylene, of between Y and Z on the Gardner-Holdt scale. Said resin was prepared, following the same procedure, starting from:

|  | Parts by weight | (%) |
|---|---|---|
| Safflower oil | 1043 | 24.6 |
| Pentaerithritol | 879 | 20.7 |
| p-tertbutylbenzoic acid | 760 | 17.9 |
| Polyoxyethylene glycol (mol. weight 4000) | 350 | 8.5 |
| Phthalic anhydride | 1200 | 28.3 |

The resin was then dispersed in water to a concentration of about 45% of dry product, and neutralized with triethylamine to a pH of 6–7.

The film prepared from the resin of Example 2, after air drying, was colorless, as was the film made from the comparative alkyd resin described above. With respect to the water resistance test, the film made of the resin of Example 2 remained unaltered, showing a bright surface, while the film made from the comparative resin showed irreversible blistering spread all over the area exposed to water, and had a completely dull appearance.

c. Preparation of an oven enamel.

The ingredients indicated hereunder in parts by weight were mixed together by rolling until the titanum dioxide had a particle size of 6µ.

|  | Parts by weight |
|---|---|
| Melamine resin (uformite MM 83; Rohm & Haas) | 8 |
| Titanium dioxide (rutile) | 25 |
| Methylglycol (co-solvent) | 6.5 |
| Diethylglycol (co-solvent) | 0.3 |

The this mixture were then admixed 60 parts of the 45% solution of the alkyd resin prepared in part (b) of Example 2, and the whole mass was then diluted to 56–57% of dry product. Then, the thus obtained dispersion was spread on an iron support in the form of a film of about 35µ thickness and was baked for 30 minutes in an oven at 120°–130°C. Thereby was obtained an enamel coating which, in addition to showing a resistance to corrosive agents, aslo proved to be completely free from yellowing, and which had a highly brilliant (glossy) aspect.

EXAMPLE 3 a. Preparation of the resinous acrylic derivative.

Into the reactor described in Example 1, were introduced 2400 g of safflower oil together with 9.5 g of xylene. This mixture was thereupon heated under stirring at 200°–210°C, until all traces of water present were eliminated, after which it was brought up to a temperature of 255°C (± 3°C). After this, into the mixture was gradually introduced acrylic acid, whereby to establish, in the reactor, a weight ratio between free acrylic acid and combined acrylic acid of 0.2 (± 0.05).

After 20 hours, during which 378 g of acrylic acid had been fed in, the reaction was interrupted, and from the reaction mixture were extracted about 63 g of unreacted acrylic acid. The reaction product amounted to about 2715 g, had a Gardner-Holdt viscosity at 25°C, measured on an undiluted sample, of between P and R, an acidity number of about 85 and a combined acrylic acid content of about 11.6% by weight.

By mixing a sample of the product with benzine in a ratio of 1:7, no significant quantity of polyacrylic acid could be detected.

b. Preparation of a water dispersible resin.

For this purpose there were used:

|  | Parts by weight | (%) |
|---|---|---|
| Resinous acrylic derivative (a) | 478 | 18.7 |
| Pentaerithritol | 508.7 | 19.9 |
| α,α-dimethylolpropionic acid | 58.8 | 2.3 |
| Alkoxypolyoxyethylene glycol (M.W.: 600) | 214.3 | 8.4 |
| p-tertbutylbenzoic acid | 378.2 | 14.8 |
| Phthalic anhydride | 506 | 19.8 |
| Safflower oil | 266 | 9.6 |
| Soya oil | 166 | 6.5 |

Into a 6 liter reactor fitted with a stirrer, all the soya oil and the safflower oil, and 400 parts by weight of pentaerithritol were introduced. This mixture was then heated at 250°C for 3 hours.

Then, to the mixture there was admixed all of the p-tert-butylbenzoic acid and the alkoxypolyoxyethyleneglycol, while bringing the mixture up to 240°C and maintaining it thereat until the mixture had constant acidity and viscosity values. At this point, to the mixture were admixed the phthalic anhydride, the acrylic derivative, the α,α-dimethylolpropionic acid and the remaining pentaerithritol, while continuing the reaction of the mixture until an acidity number of 10–12 and a viscosity value, measured on a 60% solution of the product in xylene, between U and V of the Gardner-Holdt scale were reached.

The resin thus obtained was discharged and dispersed in water in the conventional manner and, finally, was neutralized with triethylamine to a pH of 6–7.

c. Preparation of an air drying enamel.

To prepare an air drying enamel, a ball mill with steatite balls was charged with:

| | | |
|---|---|---|
| Alkyd resin of Example 3 (b) in a concentration of 45% of dry product | 250 | parts |
| Titanium dioxide (rutile) | 270 | parts |
| Lead naphthenate | 2 | parts |
| Cobalt naphthenate | 0.15 | parts |
| Mineral white spirit | 25 | parts |
| Butylcellosolve | 65 | parts |
| Soya lecithin | 4 | parts |

Then, while stirring, there were admixed to the mixture a further 350 parts of the alkyd resin and then enough water to reach a content of 42–45% of dry substance. The thus prepared paint was applied onto wooden and iron supports and was left to dry in air at 25°C. The dried film appeared bright and free from any yellowing. After 24 hours in water at 25°C, it appeared to be unaltered.

EXAMPLE 4 a. Preparation of the resinous acrylic derivative.

Into the reactor described in Example 1, were introduced 2500 g of a mixture consisting of 45% of conjugated linseed oil and of 55% of a mixture of dehydrated castor oil fatty acids with an acidity number of 175–180, together with 9 g of toluene. After elimination of the traces of water by heating to about 200°C, the mixture was brought up to 280°C (± 3°C), while acrylic acid was introduced into the reactor, being careful to maintain in the reactor, under the operational conditions, a weight ratio between free acrylic acid and combined acrylic acid equal to 0.9 (± 0.05).

After 20 hours of reaction, during which 646 g of acrylic acid had been introduced, the reaction was interrupted and from the mixture were extracted, by distillation under vacuum at 60°–80°C, about 306 g of unreacted acrylic acid.

The reaction product amounted to about 2840 g. Said product had a Gardner-Holdt viscosity, measured on an undiluted sample at 25°C, between the values $Z_5$ and $Z_6$, an acidity number of about 168 and a combined acrylic acid content of about 12%.

A 1:7 mixture of the product with benzine revealed in the product the presence of only traces of polyacrylic acid.

b. Preparation of a water dispersible resin.

For this purpose the following substances were used:

| | Parts | (%) |
|---|---|---|
| Resinous acrylic derivative of example 4 (a) | 400 | 13 |
| Pentaerithritol | 532.3 | 17.3 |
| Polyoxyethylene glycol (M.W. about 3000) | 270.8 | 8.8 |
| α,α-dimethylolpropionic acid | 70.8 | 2.3 |
| Benzoic acid | 215.4 | 7 |
| p-tertbutylbenzoic acid | 215.4 | 7 |
| Phthalic anhydride | 677 | 22 |
| Soya oil | 695.4 | 22.6 |

Into a 6 liter reactor provided with a stirrer, all the soya oil, the polyoxyethyleneglycol, the benzoic acid, the p-tert.butyl benzoic acid, the α,α-dimethylolpropionic acid, 390 parts of pentaerithritol and 2.4 parts of lithium hydroxide were introduced.

This mixture was maintained at a temperature of 245°C for 3–4 hours with stirring under reflux conditions, after which it was cooled to 150°C and admixed with the acrylic derivative (a), the phthalic anhydride and the remaining pentaerithritol. The mixture was again heated up to 235°–240°C and maintained thereat until an acidity number between 18 and 20, and a Gardner-Holdt viscosity, measured at 25°C in a 60% solution of the product in xylene between the values V and W were attained.

The thus obtained resin was dispersed in deionized water, neutralized with trimethylamine to a pH of 6–7, and finally diluted with water to a concentration of 45% by weight of dry substance.

The characteristics of the thus obtained resin were compared with those of a commercial aqueous alkyd resin endowed with special water resistance, prepared in the same way as that of this Example, by using:

| | Parts | (%) |
|---|---|---|
| Linseed oil | 480 | 34.6 |
| Pentaerithritol | 280 | 20.2 |
| Polyoxyethylene glycol (M.W. about 3000) | 130 | 9.5 |
| p-tertbutylbenzoic acid | 175 | 12.6 |
| Phthalic anhydride | 220 | 15.9 |
| Isophthalic acid | 100 | 7.2 |

The thus prepared resin had an acidity number of about 18 and a Gardner-Holdt viscosity between V and X.

Both resins, i.e., that prepared according to this Example and the comparative resin, were transformed in the conventional way into a paint vehicle, and each was then spread over an iron support in the form of a 20μ thick film, and left to dry in air at 25°C.

After drying, both films showed slight yellowing caused by the yellow coloring of the linseed oil used for their preparation. In the water-resistance test, the film of the comparative resin, after 24 hours immersion, appeared to be covered by irreversible blisters over the whole treated surface and appeared completely dulled. The film of the resin of the Example, after 96 hours in water, under the same conditions, appeared unaltered and bright.

c. Preparation of an antirust paint.

To prepare an antirust paint, a ball mill with steatite balls was charged with the following mixture and mixing was continued for 24 hours:

| | Parts |
|---|---|
| Alkyd resin of this Example (at 45% of dry substance) | 250 |
| Calcium carbonate | 220 |
| Red lead | 120 |
| Lead molybdate | 30 |
| Lead silicon chromate | 80 |
| Cobalt naphthenate | 0.3 |
| Mineral turpentine | 4 |
| Soya lecithin | 8 |
| Butylcellosolve | 30 |
| Water | 50 |

To the homogeneous mixture were then admixed, under stirring, a further 130 parts of alkyd resin and, finally, water was added to reach a concentration of 50–55% of dry substance. The thus obtained paint was applied onto an iron support. After drying, it showed a resistance to water and corrosive agents equal to that of an antirust solvent based paint.

EXAMPLE 5 a. Preparation of the resinous acrylic derivative.

Into the reactor described in Example 1, were charged 2200 g of a mixture of safflower oil fatty acids, with an acidity number of about 190, together with 8 grams of toluene.

After heating at between 200° and 210°C for about 0.5 hour, the temperature of the mixture was raised to 255°C (± 3°) and glacial acrylic acid was added at an initial flow rate of 32 g/hr., while contemporaneously feeding into the reactor a nitrogen flow. The temperature at the head of the reflux column was about 50°C.

From an examination of samples of the mixture drawn off at 15–22 minute intervals after the start of the reaction, it was found that 58% of the acrylic acid introduced had reacted, while the remaining 42% remained in the reactor in the free state which corresponds to a ratio: free acrylic acid/combined acrylic acid of about 0.7.

The feeding of acrylic acid was continued with suitable variation of the flow rate on the basis of periodically drawn samples to maintain said ratio constant at around ± 0.05 in the reactor for the duration of the reaction.

After 20 hours, during which there were fed in a total of about 650 g of acrylic acid, the reaction was interrupted in the usual manner.

About 268 g of unreacted acrylic acid were removed from the reaction mixture by distillation at 60°–80°C, under vacuum. The reaction product amounted to about 2582 g, had a combined acrylic acid content of about 14.8%, an acidity number of 275–278 and a Gardner-Holdt viscosity value, at 25°C, between Q and S.

Polyacrylic acid was present in the product only in trace amounts.

b. Preparation of a water soluble alkyd resin.

For this purpose there were used:

| | Parts |
|---|---|
| Resinous acrylic derivative of the present Example (a) | 100 |
| α,α-dimethylolpropionic acid | 300 |
| Triethylenglycol | 150 |
| Polyoxyethylene glycol (mol. wt. about 3500) | 50 |

All the above ingredients were introduced into a 6 liter reactor fitted with a stirrer, and were maintained at a temperature of 220°C (± 3°C) until an acidity number of 45–55 and a viscosity value, measured at 25°C on an 80% xylene solution between the values U and V of the Gardner-Holdt scale were attained.

The thus obtained resin was first diluted with butylcellosolve to a concentration of 80% by weight, then neutralized with triethylamine until a pH of 6–7 was reached, and finally dissolved in deionized water to a concentration of 60% by weight of dry substance.

c. Preparation of a baking enamel.

The following substances were mixed together by rolling in a roll mill:

| | Parts |
|---|---|
| Melamine resin (Uformite MM 83; Rohm & Haas) | 10 |
| Titanium dioxide (rutile) | 29 |
| Methylglycol | 8 | until the granulometry of the titanium dioxide indicated a particle size not exceeding 6 microns.

To this mixture were then admixed 75 parts of the alkyd resin solution Example 5b, with dilution of the mixture with water until a concentration of about 55% of dry substance was reached. This aqueous mixture was then applied onto an iron support in the form of a film of about 40μ thickness, and was then baked for 80 minutes at 120°–130°C. A glossy enamel, free from yellowing was thereby obtained.

EXAMPLE 6 a. Preparation of an alkyd resin.

For preparing an alkyd resin, the following were used:

| | Parts | (%) |
|---|---|---|
| Acrylic resinous derivative prepared according to Example 1 | 1960 | 48.4 |
| Trimethylolpropane | 804 | 19.8 |
| α,α-dimethylolpropionic acid | 402 | 9.9 |
| Phthalic anhydride | 889 | 21.9 |

Into a 6 liter reactor fitted with a stirrer, were introduced all the trimethylolpropane and the phthalic anhydride, together with 30 parts of toluene as an azeotropic solvent.

The mixture was then brought to a temperature between 150° and 155°C, and maintained thereat until an acidity number of 170–180 was reached. Thereupon, the α,α-dimethylolpropionic acid and 120 parts of xylene were added.

The reaction was continued at 165°–170°C until an acidity number of 100-110 was reached. Then the acrylic derivative was added to the mixture and the reaction was continued at a temperature of 160°C, until a product was obtained having an acidity number of 82–87, and a viscosity value (at 25°C in an 80% solution in isobutyl alcohol) between the values U and V of the Gardner-Holdt scale. The reaction mass was then cooled, isobutyl alcohol was added up to a concentration of 80% by weight of product, neutralized with diethanolamine to a pH of 7.5–8.5, and finally diluted with deionized water to a solution containing 60% of dry substance.

The thus obtained resin was used in the preparation of a baking enamel. This preparation was carried out in parallel with the preparation of an enamel based on a commercial water soluble alkyd resin, formed from a tricarboxylic adduct of maleic anhydride and polyunsaturated fatty acids, and prepared as follows.

400 parts of a mixture of conjugated soya oil fatty acids and 70 parts of maleic anhydride were reacted with stirring for 7 hours at 95°–100°C in the presence of 0.5 part of iodine to form a raw reaction product consisting of 70% of said tricarboxylic adduct, with the remainder being unreacted soya acids.

230 parts of this product were introduced into a reactor together with 82 parts of trimethylolpropane, 40 parts of $\alpha,\alpha$-dimethylolpropionic acid, 90 parts of phthalic anhydride and 20 parts of xylene, and the mixture was reacted with stirring at about 160°C, until an acidity number of 80–85, and a Gardner-Holdt viscosity, measured at 25°C on an 80% isobutyl alcohol solution, between U and V were obtained.

The thus prepared resin was neutralized with diethylamine to a pH of from 7.5 to 8.5, and was then diluted with water to a concentration of 60% by weight of dry substance.

For the preparation of the baking enamel, the aqueous solution of the resin of this Example and that of the commercial resin were added with 15% by weight of hexamethoxymethylmelamine and 12% by weight of titanium dioxide, based on the resin, and were then applied onto two separate iron supports and baked in an oven at about 150°C for 30 minutes.

After baking it was found that the commercial product had become quite yellow, while the enamel based on the resin of this Example remained absolutely white.

EXAMPLE 7

This example describes the preparation of alkyd resins for water paints, starting from a resinous acrylic derivative which, unlike those of the invention, contain polyacrylic acid.

a. Preparation of the resinous acrylic derivative.

Into the reactor described in Example 1, were introduced 2000 g of a mixture of dehydrated castor oil fatty acids having an acidity number of about 180, 9 g of toluene and 1.4 g of hydroquinone. The mixture was then heated at 200°C until the last traces of water were eliminated. Then the temperature was raised to 255°C ($\pm$ 3°C) and glacial acrylic acid was fed into the reactor at an initial flow rate of about 40 g/hr.

Examination of samples of the reaction mixture drawn off after 30 minutes from the start of the reaction, showed that in the reactor, the operational conditions corresponded to a weight ratio between free acrylic acid and combined acrylic acid of about 1.2. At the same time it was observed that there was formation of polyacrylic acid on the reactor walls as well as in the reaction mass.

To analyze the samples, the free acrylic acid was first extracted therefrom by distillation under vacuum at a temperature of 60°–80°C. From the residue, the polyacrylic acid was then precipitated with benzine, and finally the amount of combined acrylic acid was determined by acidimetric titration of the residue, after removal of the benzine.

After 20 hours, during which about 792 g of acrylic acid had been fed in, the reaction was stopped. By distillation under vacuum at 60°–80°C, there were extracted a total of 234 g of acrylic acid from the reaction mass. Upon analysis, the distillation residue amounted to about 2557 parts, and contained 14% of polyacrylic acid. The remainder consisted of a resinous product containing about 9% of combined acrylic acid, having an acidity number of about 231 and a Gardner-Holdt viscosity value, measured at 25°C on the undiluted sample between J and K.

b. Preparation of alkyd resin.

1. Into a reactor fitted with a stirrer, there were introduced 200 parts of the acrylic product obtained according to this Example (a) and which contained 14% of polyacrylic acid, together with 115 parts of 1,1'-isopropylene-bis-(p-phenyloxy)-di-propanol-2. The mixture was reacted at a temperature of 220°C ($\pm$ 3°), and the reaction was continued until a Gardner-Holdt viscosity value, measured at 25°C on an 80% solution of the reaction product in xylene between W and X, and an acidity number of about 80 were attained. There was thus obtained a slightly soluble resin after neutralization. A film formed from this resin was only slightly water-resistant and completely dulling in water.

2. Into a reactor similar to that used in the previous preparation, were introduced:

|  | Parts |
| --- | --- |
| Safflower oil | 1043 |
| Polyoxyethylene glycol (mol.wt.about 4000) | 380 |
| p-toluenebenzoic acid | 600 |
| Pentaerithritol | 649 |
| Lithium hydroxide | 2 |

The mixture was reacted at a temperature of about 240°C for 3–4 hours with stirring under reflux conditions. The mixture was then cooled to 150°C and was admixed with 500 parts of the acrylic derivative of this Example, containing 14% of polyacrylic acid, 860 parts of phthalic anhydride and 200 parts of pentaerithritol. The mixture was then brought up to about 250°C, and maintained thereat with stirring under reflux conditions until an acidity number of 15–20, and a Gardner-Holdt viscosity, measured at 25°C on a 60% solution in xylene between W and Y were reached.

The thus obtained resin was emulsified with water, transformed into an air drying paint vehicle and then applied as a film onto an iron support. The dried film, after resting in water at 25°C for 24 hours, showed irreversible blisters all over the surface, and was completely dulled.

Variations and modifications, can, of course, be made without departing from the spirit and scope of the invention.

Having thus described our invention, what we desire to secure by Letters Patent and hereby claim is:

1. Water soluble and water dispersible alkyd resins, comprising the product of the reaction between:
   a. the resinous product, substantially free of polyacrylic acid, obtained by reacting glacial acrylic or methacrylic acid with at least one polyunsaturated monocarboxylic fatty acid or esters thereof with a polyvalent alcohol, at a temperature between 250° and 300°C., under conditions such that the weight ratio between the unreacted glacial acrylic or methacrylic acid and the acrylic or methacrylic acid combined with said polyunsaturated fatty acid or esters thereof is between 0.1 and 1, said resinous product having an acidity number between 60 and 280, and a Gardner-Holdt viscosity value between P and $Z_6$;

b. a polyvalent alcohol having from 2 to 6 primary or secondary hydroxyl groups wherein the weight ratio between said polyvalent alcohol and the resinous product (a) is between 1:9 and 9:1; and optionally c. at least one compound capable of reacting with a product selected from the group consisting of the product (a) and polyvalent alcohol (b), and being selected from the group consisting of saturated monocarboxylic acids, unsaturated monocarboxylic acids, saturated dicarboxylic acids, unsaturated dicarboxylic acids, siccative oils and non-siccative oils, the amount of said compound (c), if present, not exceeding about 60% by weight of the total weight of components (a) + (b) + (c).

2. An alkyd resin according to claim 1, wherein the ratio of the polyvalent alcohol (b) to product (a) is between 1:5 and 5:1.

3. An alkyd resin according to claim 2 wherein compound (c) is present in an amount between 10% and 60% by weight of the total weight of components (a) + (b) + (c).

4. An alkyd resin according to claim 3 wherein the amount of each of product (a) and polyvalent alcohol (b) varies from 10 to 50% by weight of the total weight of components (a) + (b) + (c).

5. An alkyd resin according to claim 1 wherein compound (c) is present in an amount between 10 and 60% by weight of the total weight of components (a) + (b) + (c).

6. An alkyd resin according to claim 5 wherein the amount of each of product (a) and polyvalent alcohol (b) varies from 10 to 50% by weight of the total weight of components (a) + (b) + (c).

7. An alkyd resin according to claim 6 and consisting essentially of the product of the reaction between:

| | |
|---|---|
| resinous product (a) | 10 – 20% |
| at least one polyvalent alcohol other than polyoxy- and alkoxypolyoxyethylene glycols | 25 – 35% |
| polyoxyethylene glycol having a molecular weight of from 1000 to 6000 | 5 – 15% |
| monocarboxylic acids | 10 – 20% |
| dicarboxylic acids | 10 – 40% |
| siccative or non-siccative oils | 10 – 30%. |

8. An alkyd resin according to claim 6, and consisting essentially of the product of the reaction between:

| | |
|---|---|
| resinous product (a) | 40 – 50% |
| polyvalent alcohol | 20 – 40% |
| dicarboxylic acids | 20 – 40%. |

* * * * *

UNITED STATES PATENT OFFICE
CERTIFICATE OF CORRECTION

Patent No. 3,894,978            Dated July 15, 1975

Inventor(s) GIORGIO MONTESISSA et al

It is certified that error appears in the above-identified patent and that said Letters Patent are hereby corrected as shown below:

Title page, left side, under "Foreign Application Priority Data": "22726/73" should read -- 22726-A/73 --.

Column 1, lines 8-9: "456,950, filed by Giorgio Montesissa and Giancarlo Del Signore owned by the assignee hereof," should read -- 456,950 owned by the assignee hereof --; line 22: "in which said" should read -- wherein the --; line 60: "type acid" should read -- type tricarboxylic acid --.

Column 2, line 17: "water soluble" should read -- water-soluble --; line 36: "300°C," should read -- 300°C, and --.

Column 3, line 17: "quatities" should read -- quantities --; line 29: "an" should read -- as --; line 53: "ennsure" should read -- ensure --; line 54: "mmay" should read -- may --.

Column 4, line 3: "interupted" should read -- interrupted -- line 39: "having a molecular" should read -- having molecular --; lines 40-41: "having a molecular" should read -- having molecular --.

Column 5, line 27: "iniclude" should read -- include --.

Column 6, line 48: "seccative" should read -- siccative --.

PO-1050
(5/69)

UNITED STATES PATENT OFFICE
CERTIFICATE OF CORRECTION

Patent No. 3,894,978           Dated July 15, 1975

Inventor(s) GIORGIO MONTESISSA et al      Page 2

It is certified that error appears in the above-identified patent and that said Letters Patent are hereby corrected as shown below:

Column 8, line 28: "butyl-cellulosolve" should read -- butylcellosolve --.

Column 9, line 5 of the first table: "20.9" should read -- 20.3 --.

Column 10, line 15: "The this" should read -- To this --; line 24: "aslo" should read -- also --.

Column 14, line 2: "and were maintained" should read -- and maintained --.

Signed and Sealed this twenty-fifth Day of November 1975

[SEAL]

Attest:

RUTH C. MASON
Attesting Officer

C. MARSHALL DANN
Commissioner of Patents and Trademarks